(12) United States Patent
Neudinger

(10) Patent No.: US 11,397,292 B2
(45) Date of Patent: Jul. 26, 2022

(54) LIGHTING DISPLAY ASSEMBLY

(71) Applicant: Novomatic AG, Gumpoldskirchen (AT)

(72) Inventor: Philipp Neudinger, Gumpoldskirchen (AT)

(73) Assignee: Novomatic AG, Gumpoldskirchen (AT)

( * ) Notice: Subject to any disclaimer, the term of this patent is extended or adjusted under 35 U.S.C. 154(b) by 43 days.

(21) Appl. No.: 17/081,137

(22) Filed: Oct. 27, 2020

(65) Prior Publication Data

US 2022/0128755 A1    Apr. 28, 2022

(51) Int. Cl.
*F21V 8/00* (2006.01)
*G07F 17/32* (2006.01)

(52) U.S. Cl.
CPC ......... *G02B 6/0035* (2013.01); *G02B 6/0078* (2013.01); *G02B 6/0091* (2013.01); *G07F 17/3211* (2013.01)

(58) Field of Classification Search
None
See application file for complete search history.

(56) References Cited

U.S. PATENT DOCUMENTS

| 9,994,143 | B2* | 6/2018 | Ferigo | F21S 43/145 |
| 10,775,549 | B2* | 9/2020 | Thompson | G02B 6/0043 |
| 10,775,551 | B2* | 9/2020 | Thompson | G02B 6/009 |
| 11,029,461 | B2* | 6/2021 | Thompson | G02B 6/0043 |
| 2020/0233137 | A1* | 7/2020 | Thompson | G02B 6/0093 |

* cited by examiner

*Primary Examiner* — Ronald Laneau
(74) *Attorney, Agent, or Firm* — RowanTree Law Group, PLLC; Magdalena M. Fincham

(57) ABSTRACT

A lighting display assembly includes a light guide frame composed of at least two or more light guide frame parts and a light source. The frame parts are made of material that is transparent to light. The light guide frame includes a front and rear surface, and a center opening extending between the surfaces and defining an inner sidewall. The light source is configured to emit light and is positioned facing the inner sidewall so that light emitted therefrom passes through the inner sidewall and into the frame. A surface structure formed in or on the frame and is positioned to be illuminated by the light emitted from the light source and entering the inner sidewall of the frame so that the light is scattered and/or refracted and is emitted from the front surface of the frame. A controller is configured to controllably activate and deactivate the light source.

22 Claims, 4 Drawing Sheets

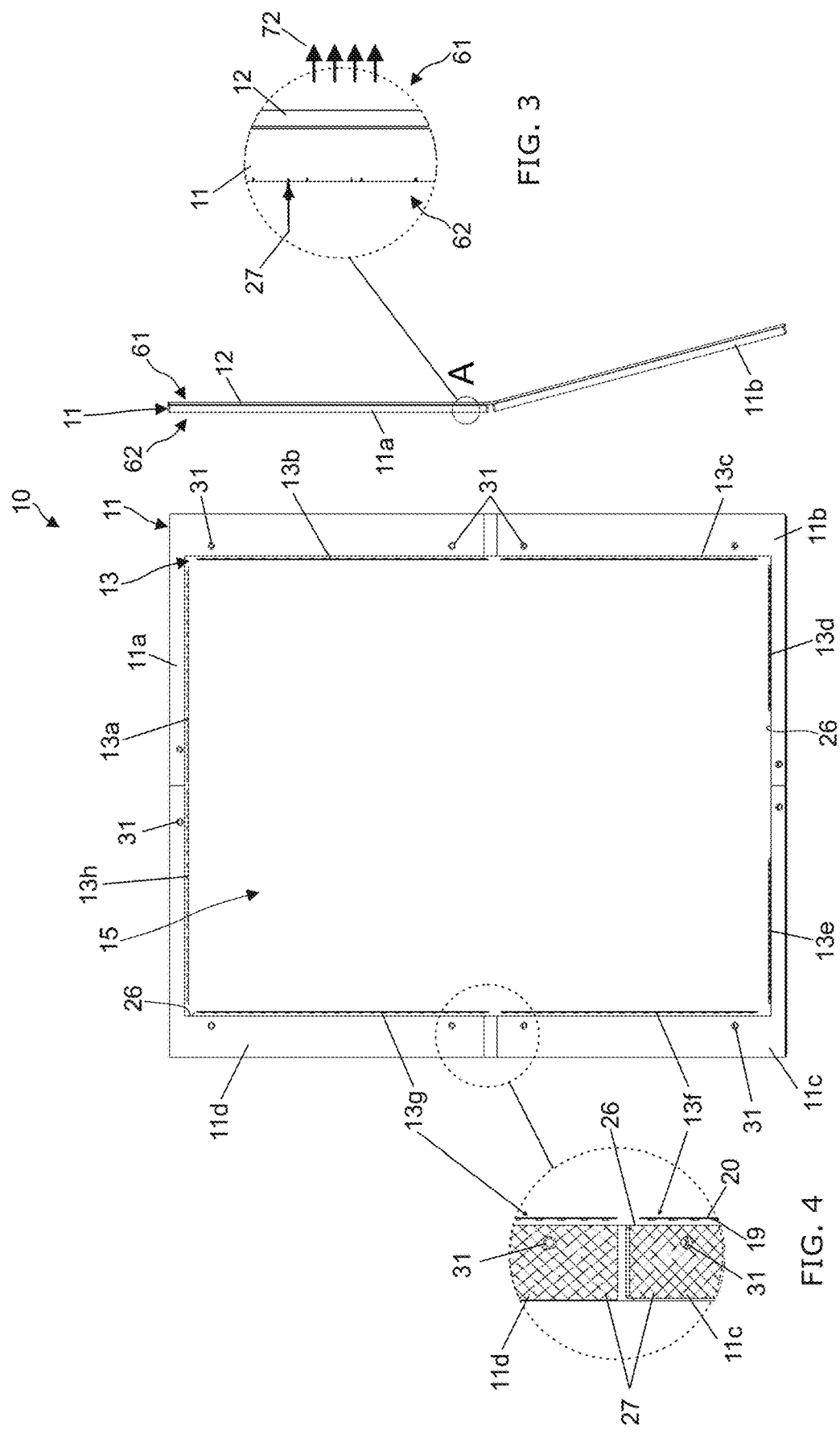

LIGHTING DISPLAY ASSEMBLY

BACKGROUND

Gaming machines often include lighted displays that incorporate colors and themes consistent with the games offered on the gaming machine. Operators of gaming businesses strive to provide the most entertaining, engaging, and exciting machines to attract customers to use the machines while also providing a machine that allows the player to enjoy their gambling experience. Accordingly, there is a continuing need for gaming machine manufacturers to develop new games and gaming machines that are in particular comparatively simple and/or efficiently producible in order to maintain or increase player enjoyment.

SUMMARY

Aspects of the present disclosure relate to a lighting display assembly for a gaming machine.

Certain aspects of the present disclosure relate to a lighting display assembly comprising a light guide frame and a light source. The light guide frame is composed of at least two light guide frame parts made of material that is transparent to light.

According to an embodiment, each of the two light guide frame parts is U-shaped and both frame parts may be arranged together to define a substantially rectangular opening that is extending between its front and rear surfaces and defining an inner sidewall of the light guide frame. The light source is configured to emit light and is positioned facing the inner sidewall so that light emitted therefrom passes through the inner sidewall and into the light guide frame. A surface structure is formed in and/or on the light guide frame parts and positioned to be illuminated by the light emitted from the light source, which light is then scattered and/or refracted light visible from in front of the device (user operating position). A lighting controller may be provided to controllably activate and deactivate the light source. The U-shaped frame parts may be arranged to form a respective joint at a top center position and bottom center position of the lighting display assembly.

According to a preferred embodiment, the light guide frame is composed of four light guide frame parts, each of which is made of material that is transparent to light. Each of the light guide frame parts is L-shaped, i.e. having legs substantially perpendicular to each other and the four frame parts may be arranged to define a substantially rectangular opening that is extending between its front and rear surfaces and defining an inner sidewall of the light guide frame. It may be appreciated that the respective legs of the L-shaped light guide frame parts may be of equal or unequal length and may be fitted depending on design and other considerations, for instance an optimal degree of utilization when cutting out the shapes/legs of the light guide frame parts from a plate-shaped raw material.

The L-shaped frame parts may be arranged to form a respective joint at a top center position and bottom center position and a left center position and a right center position of the lighting display assembly.

In some embodiments, the surface structure redirects at least a portion of the light emitted from the light source and entering the sidewall wall of the light guide frame towards the front surface of the light guide frame. In certain embodiments, the surface structure may reflect and/or refract at least a portion the visible light emitted from the light source and entering the sidewall of the light guide frame towards the front surface of the light guide frame light.

Embodiments of the lighting display assembly may include a rear panel configured to support the light source relative to the light guide frame. In certain embodiments, the light source may include a lighting bracket that carries a plurality of light emitting diodes. The lighting bracket may be mounted to the rear panel such that the plurality of light emitting diodes align with the sidewall of the light guide frame so that light emitted therefrom passes through the inner sidewall and into the light guide frame. Some embodiments include a plurality of the lighting brackets, where each lighting bracket includes a plurality of light emitting diodes.

In some embodiments, the rear panel may include a rear panel opening that aligns with the center opening defined by the light guide frame.

Some embodiments may comprise a milky white translucent or opaque cover overlying the light guide frame. The translucent cover may include a center opening that aligns with the center opening of the light guide frame.

In some embodiments, the surface structure is formed in the rear surface of the light guide frame. In certain embodiments, the surface structure may be laser etched into the rear surface of the light guide frame. In some embodiments, the surface structure may be screen printed onto the rear surface of the light guide frame.

In some embodiments, the lighting display assembly may be angled. In particular, the lower half of the lighting display assembly is angled in view of the upper half of the lighting display assembly. In other words, frame parts may form an obtuse angle with respect to each other, preferably around the horizontal central axis of the lighting display assembly.

In some embodiments, the obtuse angle may be in the range between 150° and 180°, preferably 165°.

In some embodiments, the translucent cover parts are dimensioned so that a bend or curvature is possible at the transition point (horizontal central axis) during assembly of the cover parts, i.e. a radius is formed at this transition area.

Some embodiments of the disclosure relate to a gaming machine that includes a cabinet, a display monitor, and a lighting display assembly. The display (monitor) may be supported by the cabinet with the lighting display assembly being positioned behind the display (monitor). The lighting display assembly may include a light guide frame and a light source.

According to a further embodiment, the light guide frame may be formed from a single piece of material that is transparent to visible light. The light guide frame may include a center opening extending between its front and rear surfaces and defining an inner sidewall of the light guide frame. The light source is configured to emit visible light and is positioned facing the inner sidewall so that light emitted therefrom passes through the inner sidewall and into the light guide frame. A surface structure is formed in the light guide frame and is positioned to be illuminated by the visible light emitted from the light source and entering the sidewall of the light guide frame so that the light is scattered and/or refracted and is visible from the front surface of the light guide frame. The gaming machine may also include a controller configured to controllably activate and deactivate the light source.

In some embodiments, the light guide frame is sized to extend laterally beyond at least one outer peripheral edge, preferably all outer peripheral edges, of the display monitor or an arrangement of two or more displays such that the illuminated surface structure is visible from in front of the display monitor(s). In certain embodiments, the center opening of the light guide frame may be positioned inward of the outer peripheral edge of the display monitor.

In some embodiments, the lighting display assembly may include mounting features configured to secure the lighting display assembly to at least one of the cabinet and/or the display monitor.

In some embodiments, the gaming machine includes a display mounting retainer or bracket mechanism for mounting the display monitor to the gaming machine. In certain embodiments, the display mounting retainer mechanism may extend through the center opening of the light guide frame.

BRIEF DESCRIPTION OF THE DRAWINGS

Features and advantages of certain embodiments of the present invention will become apparent from the following description of embodiments thereof, by way of example only, with reference to the accompanying drawings, in which;

FIG. 1 is a front elevation view illustrating a lighting display assembly according to an embodiment of the present disclosure.

FIG. 2 is a side view of FIG. 1.

FIG. 3 is an enlarged view of a portion of FIG. 2.

FIG. 4 is an enlarged view of a portion of FIG. 1.

DETAILED DESCRIPTION

Figure 6:
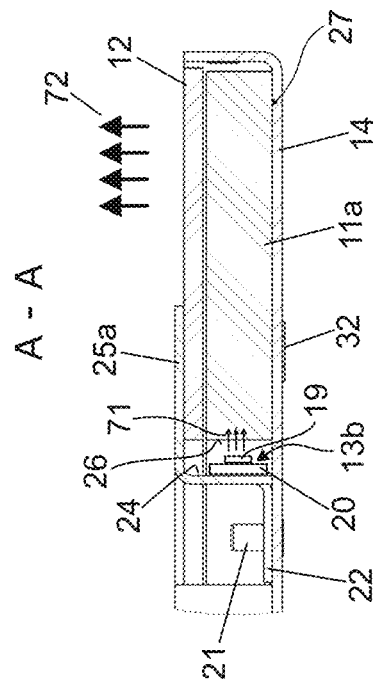
FIG. 6 is a cross-sectional view along line A-A of FIG. 5.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

Referring to the drawings, there are shown example embodiments of lighting display assembly for a gaming machine. FIG. 1 is a front elevation view of a light guide frame 11 of a lighting display assembly according to an exemplary embodiment of the present disclosure, the FIG. 2 shows the respective side view. As described in greater detail below, the lighting display assembly is configured for use with a gaming machine, such as a slot machine (cf. FIG. 9), and is designed to be mounted behind a video display (monitor) of the gaming machine. In the illustrated embodiment, the lighting display assembly 10 has a generally rectangular shape to conform to the shape of the video display of the gaming machine. It may be appreciated, however, that the lighting display assembly 10 may take other shapes, for instance, circular, or oval, depending on design and other considerations. The lighting display assembly 10 includes a center opening 15 to facilitate its installation on a gaming machine, as is explained in greater detail below.

The light guide frame 11 in this case is composed of four (4) light guide frame parts 11a-11d, each of which is made of material that is transparent to visible light. Each of the light guide frame parts 11a-11d is L-shaped with legs of—in this embodiment—approximately equal length. It may be appreciated that the respective legs of the L-shaped light guide frame parts 11a-11d may be of unequal length and may be fitted depending on design and other considerations, for instance an optimal degree of utilization when cutting out the shapes/legs of the light guide frame parts from a plate-shaped raw material.

In some embodiments, the light guide frame 11 (respectively its frame parts) is formed from clear acrylic, such as polymethylmethacrylate (PMMA). In other embodiments, the light guide frame 11 may be formed from a variety of different materials including, for example, polycarbonate or cycloolefin polymer. The light guide frame 11 has a front surface 61, a rear surface 62, and a center opening 15 extending between the front and rear surfaces and defining an inner sidewall 26.

As particularly shown in FIG. 2, the lighting display assembly 10 comprises a translucent or opaque cover 12 overlying the light guide frame 11 (viewed from the user device operating position). The translucent cover 12 is preferably of a milky white translucent material and is composed of two translucent cover parts 12a, 12b, each formed from a single piece of material. Each of the cover parts 12a, 12b may be cut out from a plate-shaped raw material. Each of the two translucent cover parts 12a, 12b is U-shaped and preferably of the same size. Both cover parts 12a, 12b may be arranged to define a substantially rectangular opening that is extending between a cover front surface and cover rear surface wherein the respective ends of the two U-shaped cover parts 12a, 12b form a respective joint 81, 82, which preferably runs vertically, at a top center position and bottom center position of the lighting display assembly 10. In other words, the two joints are on a vertical that is preferably in the center of the lighting display assembly.

Further with reference to FIG. 2, the lighting display assembly 10 in the shown embodiment is angled. In particular the lower half of the lighting display assembly 10, i.e. comprising the coplanar light guide frame parts 11b and 11c, is angled in view of the upper half of the lighting display assembly 10. In other words, the coplanar light guide frame parts 11a and 11d form an obtuse angle with respect to the coplanar light guide frame parts 11b and 11c, preferably around the horizontal central axis of the lighting display assembly 10. The obtuse angle may be in the range between 150° and 180°, preferably 165°.

It is to be mentioned that the translucent cover parts 12a, 12b are dimensioned so that a bend or curvature is possible at the transition point (horizontal central axis) during assembly of the cover parts 12a, 12b, i.e. a radius is formed at this transition area.

The translucent cover 12 include a center opening that aligns with the center opening of the light guide frame 11.

Figure 5:
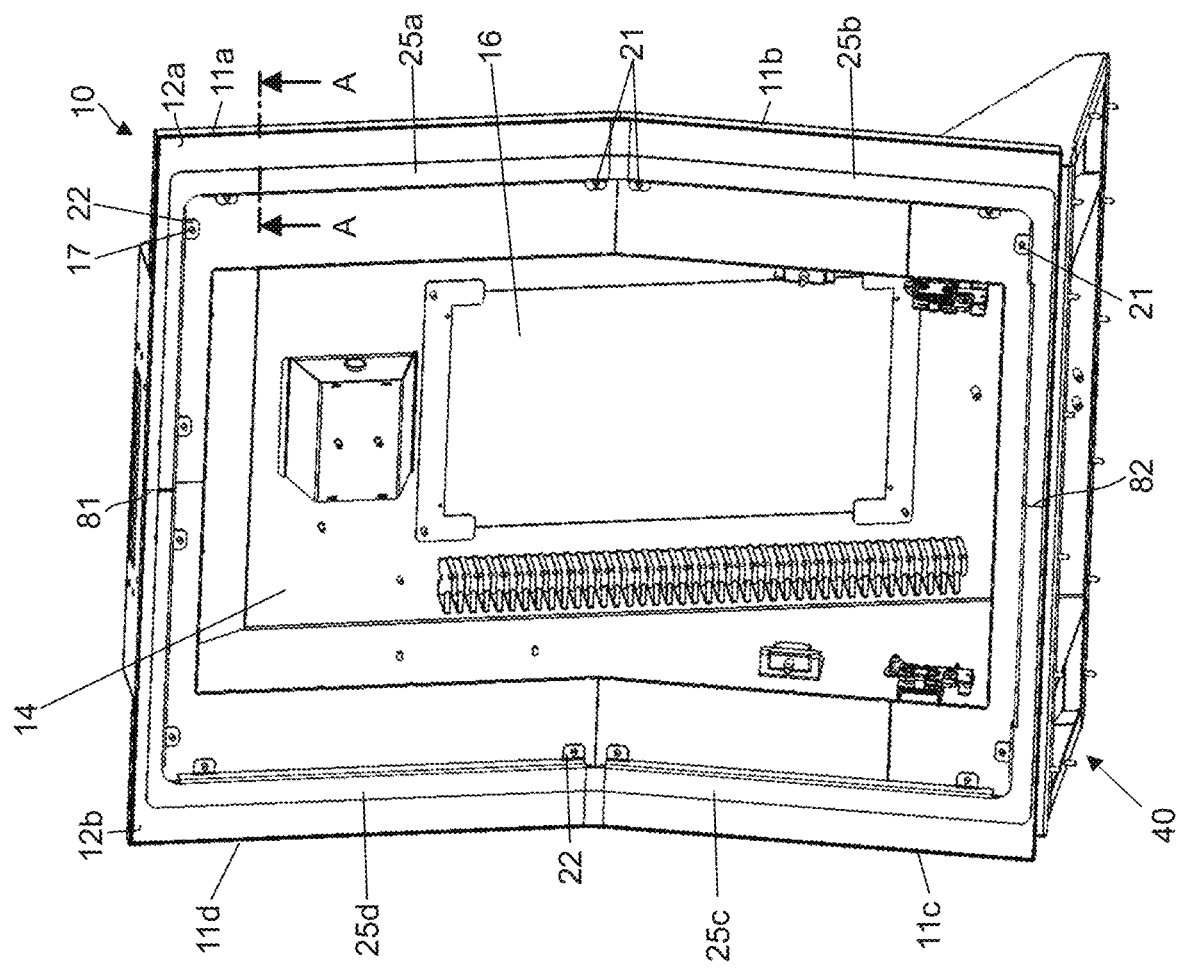
FIG. 5 is a perspective view of a lighting display assembly according to an embodiment of the present disclosure.

FIG. 5 shows a perspective view of a lighting display assembly 10 according to an embodiment of the present disclosure. A rear panel 14 serves as the mounting platform for various components and also includes features that permit the lighting display assembly 10 to be mounted to a gaming machine (cf. also FIG. 9). The rear panel 14 may be formed of sheet steel or from a durable, light-weight material. In some embodiments, the rear panel 14 may be cast from aluminum. Other suitable materials may include plastics, such as a PVC or ABS plastics.

Figure 7:
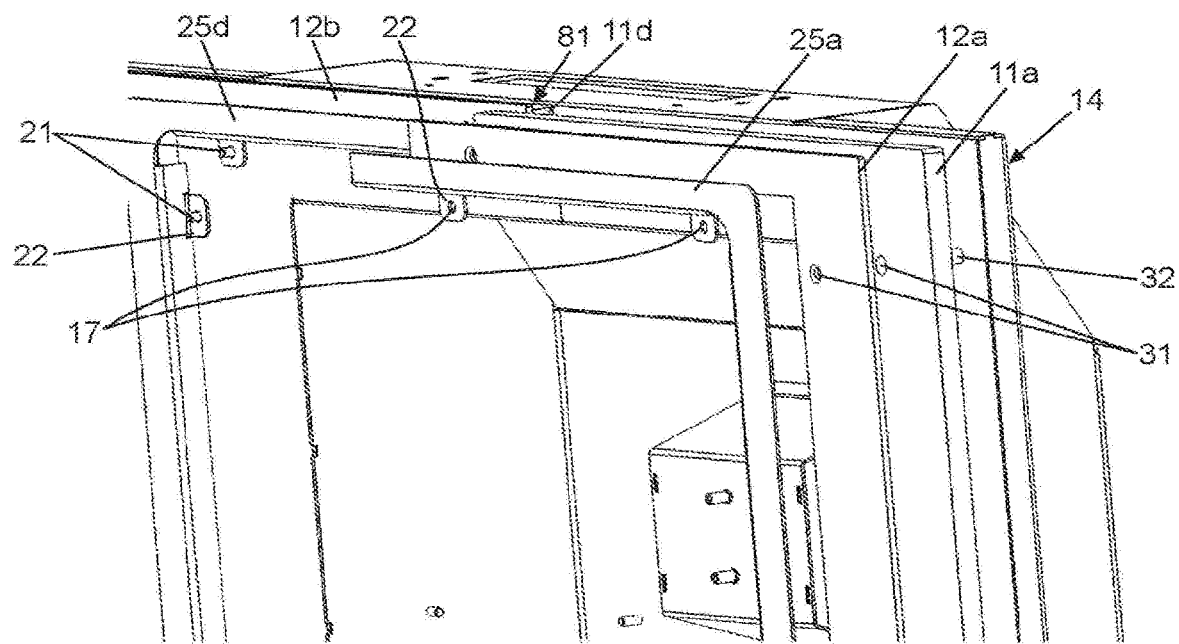
FIG. 7 is an exploded perspective view of a lighting display assembly according to an embodiment of the present disclosure.

The rear panel 14 may be generally rectangular and includes a rear panel center opening 16. The rear panel center opening 16 in one embodiment, for example, may only be opened from the inside of the housing structure formed by the components. A plurality of apertures 31—at least one or two within each of the light guide frame parts 11a-11d and translucent cover parts 12a, 12b—may be positioned along the center opening 15 and permit the lighting display assembly 10 to be secured or mounted to the rear panel 14, (and hence to a gaming machine) by threaded fasteners, such as bolts. Respective apertures 31 may be bores, which bores are coaxial in the respective light guide frame parts 11a-11d and respective translucent cover parts 12a, 12b positioned above (cf. FIG. 7).

The light source 13 includes at least one lighting bracket configured to be mounted to and supported by the rear panel 14.

The light source 13 is preferably accommodated or arranged in the form of a multiplicity (plurality) of LEDs 19 arranged in rows, wherein said multiplicity of LEDs 19 may be arranged at equal intervals (distances) on a strip-shaped carrier board 20 or can be part of an LED strip.

In the illustrated embodiment, the light source 13 includes four (4) lighting brackets 25a-25d, each of the lighting brackets 25a-25d is embodied as an angled part with two perpendicular angle arms having preferably an unequal L-profile, i.e. consisting of two legs/arms of different length which are perpendicular to each other. In the present embodiment each lighting bracket 25a-25d has two (2) tabs 22 on the same side of a respective arm, however, spaced from each other. Each of the tabs 22 being arranged to extend outwards from, preferably the narrower side of the L-shaped profile, i.e. the tabs 22 are arranged parallel to the longer side of the L-shaped profile (cf. FIG. 6). It is appreciated that the arrangement and alignment of the tabs 22 can be adapted to the circumstances of the rear panel 14. Other embodiments may utilize a larger or smaller number of lighting brackets depending, for example, on design, manufacturing and assembly considerations. The rear panel 14 presents a plurality of first bosses 21 that extend out or protrudes from the rear panel 14. Fasteners, e.g., bolts, extend through respective (openings) apertures 17 in the respective tabs 22 of the lighting brackets 25a-25d and thread into the respective first bosses 21 to secure the lighting brackets 25a-25d to the rear panel 14.

FIG. 5 shows the lighting brackets 25a-25d installed on the rear panel 14.

Each lighting bracket 25a-25d carries a plurality of lighting elements, such as light emitting diodes (LEDs) 19. In one or more embodiments, the LEDs 19 are mounted to an inner face 24 of the L-profile of the arms of a respective lighting bracket 25a-25d. In some embodiments, the plurality of LEDs 19 may be formed from LED strips that are cut to length and attached to the bottom face of the respective lighting bracket 25a-25d, e.g., by adhesive. In the embodiment shown in FIG. 1 at each of the lighting brackets 25a-25d there are arranged two LED stripes, i.e. lighting bracket 25a carries or holds LED-stripes 13a and 13b, lighting bracket 25b carries or holds LED-stripes 13c and 13d, lighting bracket 25c carries or holds LED-stripes 13e and 13f, and lighting bracket 25d carries or holds LED-stripes 13g and 13h. The LEDs 19 can be energized (applying voltage and current) to produce visible light. According to one or more embodiments, the LEDs 19 can produce full-color light.

According to an embodiment, the operation of the LEDs 19 may be controlled according to a control signal that may be provided by a lighting controller (not shown in the figures). In some embodiments, the LEDs 19 may be interconnected with the lighting controller by a plurality of connectors, e.g., wires. For example, they can be connected in series wherein a first connector interconnects the LEDs 19 of the first lighting bracket 25a to the lighting controller. A second connector interconnects the LEDs 19 of the first and second lighting brackets 25a, 25b. A third connector interconnects the LEDs 19 of the second and third lighting brackets 25b, 25c. A fourth connector interconnects the LEDs 19 of the third and fourth lighting brackets 25c, 25d. Control signals may be supplied from the lighting controller to the LEDs 19 via the connectors for controlling operation (e.g., activation, deactivation, intensity, and/or color) of the LEDs 19. In at least some embodiments, each lighting bracket may include one or more LED driver chips for controlling operation of the LEDs on a respective bracket in response to the control signals. In some embodiments, pairs of LEDs may be connected in series to a respective driver chip. In certain embodiments, each LED driver chip may control a determined number of RGB (red, green, blue) LEDs or pairs of LEDs. In certain specific embodiments, each LED driver may control 8 RGB (red, green, blue) LEDs or pairs of LEDs for outputs in total, e.g., 8×3 RGB signals.

As shown in FIG. 5, the light guide frame 11 is installed onto the rear panel 14 with its center opening 15 overlying the rear panel center opening 16. In some embodiments, the center opening 15 of the light guide frame 11 is sized and shaped to form a close fit around the outer periphery of the lighting brackets 25a-25d. In this manner, the lighting brackets 25a-25d-function to aid with installation of the light guide frame 11 onto the rear panel 14 and to maintain the orientation of the light guide frame 11 relative to the LEDs 19 respectively LED-stripes 13a-13h.

Once installed, the inner sidewall 26 of the light guide frame 11 is aligned with the LEDs 19 in that emitting surfaces of each of the LEDs 19 may touch the surface of the inner sidewall 26 or there are small gaps (within assembly tolerances) between the light emitting surfaces and the inner sidewall surface. Light 71 emitted from the LEDs 19 passes through the inner sidewall 26 and into the light guide frame 11. A surface structure 27 formed in or on the light guide frame 11 is positioned to be illuminated by the visible light 71 emitted from the light source 13 and entering the sidewall 26 of the light guide frame 11 so that the light is scattered and/or refracted by the surface structure 27 and emitted (arrows 72) from the front surface side of the light guide frame 11.

In some embodiments, the surface structure 27 may be formed in or on the rear surface 62 of the light guide frame 11. In some embodiments, the surface structure 27 is formed by laser etching the surface structure into the rear surface of the light guide frame 11. In some embodiments, the surface structure 27 may be screen printed, e.g. in white ink or a color which is similar to white or very light, onto the rear surface of the light guide frame 11. A variety of other techniques may be used to form the surface structure 27, including, for example, machining, milling, chemical etching, etc. The surface structure 27 redirects at least a portion of the light emitted from the light source 13 and entering the sidewall 26 of the light guide frame 11 towards the front surface of the light guide frame 11. In some embodiments, the surface structure 27 reflects and/or refracts at least a portion the visible light emitted from the light source 13 and entering the sidewall 26 of the light guide frame 11 towards the front surface side of the light guide frame 11 to be emitted by this towards the device operating position.

Figure 8:
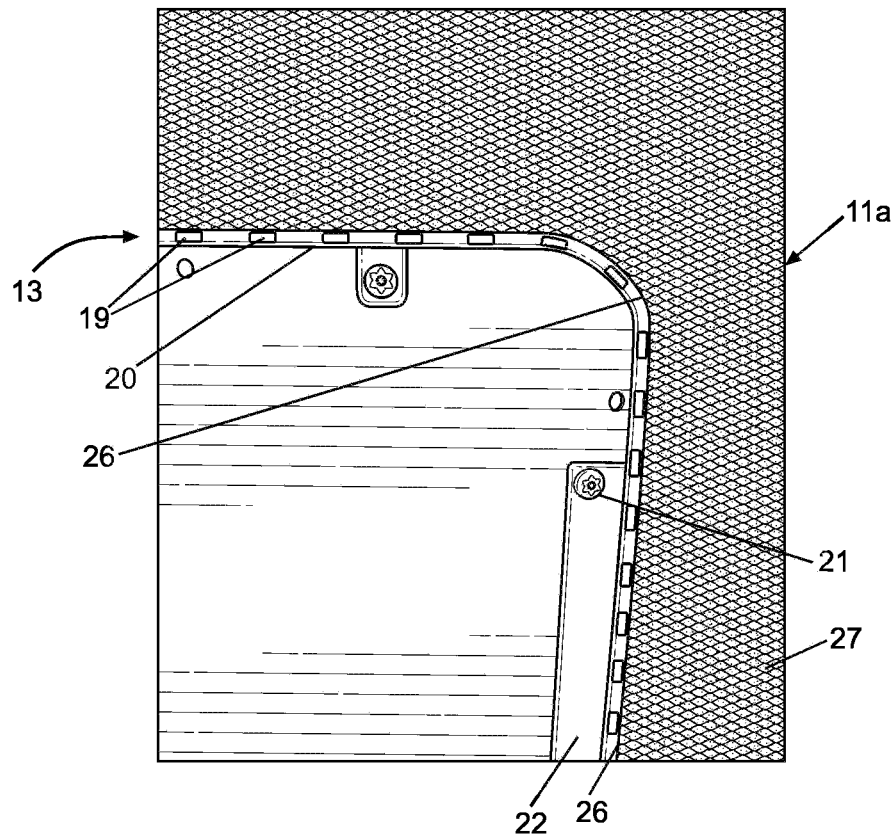
FIG. 8 shows a part of a lighting display assembly according to a further embodiment of the present disclosure.

An example of a surface structure 27 is shown in greater detail in FIG. 8. In this example, the surface structure 27 includes crossing lines. While the surface structure is illustrated as crossing lines, the surface structure may take a variety of forms, including, for example, geometric shapes, letters, symbols, and/or combinations thereof. The crossing lines may form a line grid made of continuous, crossing lines, said line grid extending uniformly over the flat side of the light guide frame surface. Surprisingly, high equalization of the light emission from the light guide frame can also be achieved by such a simple line grid, as a result of which it is possible to avoid relatively large transmission losses in the edge regions of the light guide frame. In some embodiments, the light guide frame 11 includes an inner non-surface structured region adjacent to the center opening. As a result, light from the LEDs passes through the non-surface structured region without being deflected towards the front surface before hitting the surface structure where it is deflected towards the front surface illuminating the surface structure. According to an embodiment, a reflective layer may be arranged on the side with the surface structure 27, particularly the respective portion of the rear panel 14 side facing the surface structure 27 may have a reflective layer, for example be polished.

The LEDs 19 may be spaced at regular intervals to provide consistent or evenly distributed illumination. In some embodiments, the LEDs 19 may be spaced at a pitch from the selection between ten (10) to fifteen (15) Millimeters, for example. The spacing may be varied in different embodiments to achieve the desired light intensity and to reduce spotting. The internal corners of the light guide frame 11 may be right angled or may be beveled at a determined angle. For example, in some embodiments, the corners may be beveled at approximately 45° relative to the inner sidewalls. The internal corners of the light guide frame 11 may be rounded, i.e. having a radius. In some embodiments, the spacing between LEDs in the beveled or rounded corners may be reduced in comparison to the spacing along the linear sidewalls. The combination of beveled corners and reduced LED spacing in this region may function to better illuminate the outer corners of the light guide frame 11.

According to an embodiment, the light guide frame 11 may also include an outer non-surface structured region along its outer edge. A chamfer may be formed in the back surface of the light guide frame in this outer non-surface structured region. The chamfer may function to redirect light towards the front surface to create a glow at the outer edge of the light guide frame 11.

Each of the two translucent cover parts 12a, 12b is mounted on the respective position on top of the light guide frame 11 and is secured in place by fasteners that extend through openings 31 in the translucent cover and respective light guide frame parts 11a-11d and thread into threaded openings formed in the rear panel 14. In the illustrated embodiment, the threaded openings are formed in second bosses 32 that project or protrude from the front face of the rear panel 14. The translucent cover includes a center opening that overlies the center openings in the light guide frame 11 and the rear panel. The rear panel includes a mounting feature 40 to permit the lighting display assembly to be mounted to a gaming machine, for example (cf. FIG. 5). In the illustrated embodiment, the mounting feature includes a plurality of pins or bolts positioned along a circumference of a lower adapter surface of the rear panel that allow the rear panel to be secured to the gaming machine using e.g. threaded fasteners, such as bolts. The lower adapter surface provides enough space so that protected wiring is possible between the lightning display assembly and the gaming machine base.

The center opening defined by the translucent cover parts 12a, 12b is sized so that the apertures in the rear panel 14 can be accessed through the center opening to facilitate installation the lighting display assembly onto a gaming machine. The translucent cover is made from a translucent opaque material, such as an opaque polymethylmethacrylate (PMMA) or for instance Satinice acrylic sheets, and functions to enable a more even light distribution of the light emitted from the light guide frame surface. The translucent cover may also prevent damage to the light guide frame 11.

Side covers are formed or installed around the outer edges of the lighting display assembly 10 to conceal the sides of the other components and provide a finished appearance to the assembly. Mounting features (not shown) may be formed on the side covers and one or more other components of the assembly 10 to secure the side covers in place. Alternatively, in some embodiments, the side covers may be secured in place by adhesive, screws or other connection elements. In some embodiments, the side covers are formed from extruded aluminum. Other suitable materials for the side covers may include plastics and sheet steel, for example.

Figure 9:
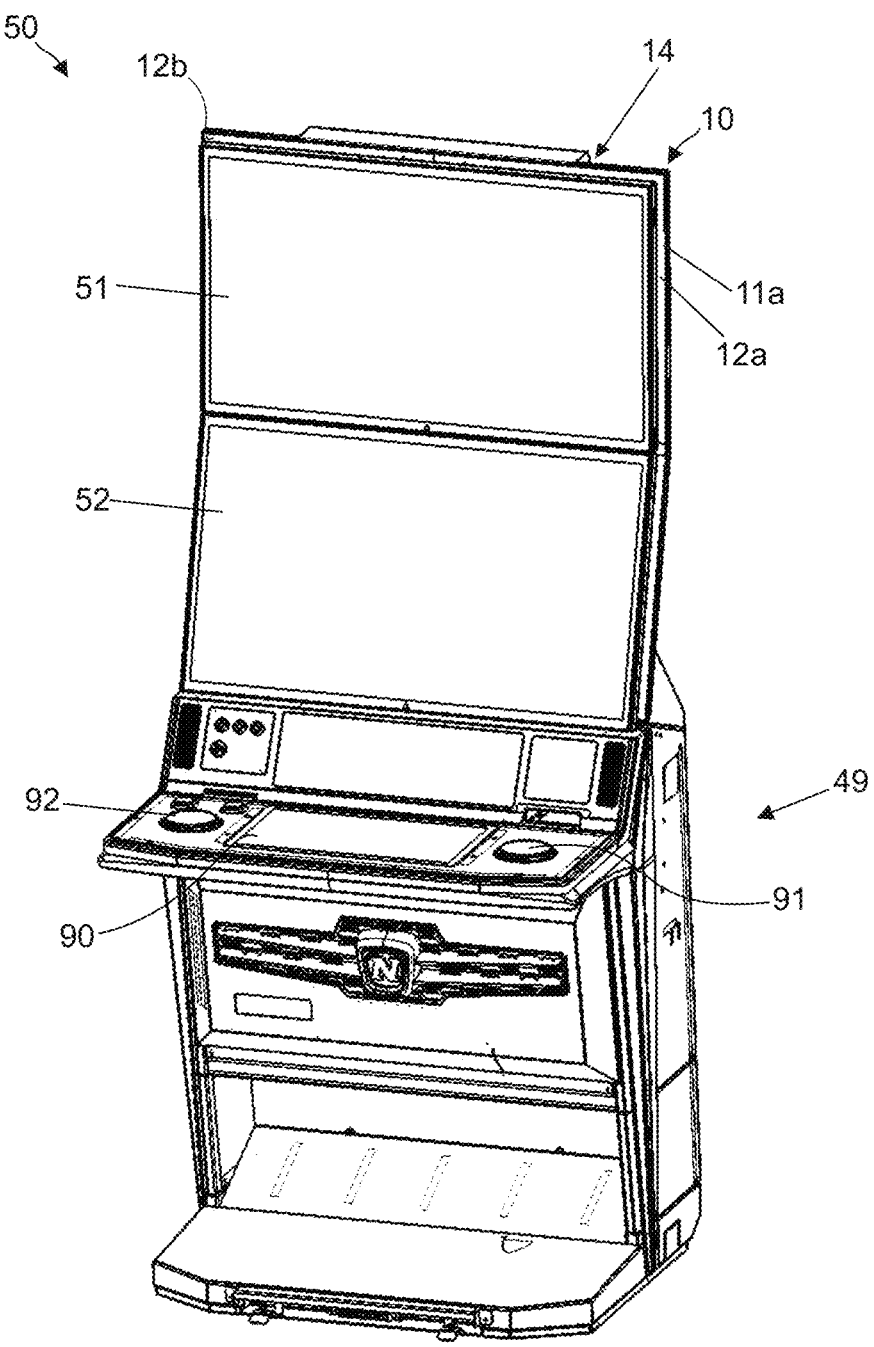
FIG. 9 illustrates the lighting display assembly of FIG. 5 installed on a gaming machine.

FIG. 9 illustrates the lighting display assembly 10 of FIG. 5 installed onto a gaming machine base cabinet 49 to form a gaming machine 50. The gaming machine function may, for example, be a video slot machine of the type commonly used in the gaming industry. The lighting display assembly 10 in this embodiment supports a first and second display monitor 51, 52, which in the present embodiment are attached to a common mounting element (not shown in the figures) and form a display module. The gaming machine 50 comprises an interface for controlling operation of the gaming machine. The interface comprises a touch screen display 90, a start button 91, and an automatic start button 92, a ticket/bill acceptor, and a ticket printer. Optionally a carded cashless or cardless cashless interface may be provided for handling credits of the gaming machine for operation.

The lighting display assembly 10 is adapted to be positioned behind the display monitors 51, 52 (viewed from the user device operating position in front of the gaming machine). As can be seen, the lighting display assembly 10 is sized and positioned to extend beyond the outer edge (periphery) of the display monitors 51, 52 such that the illuminated surface structure is visible from in front of the display monitors from the user operating position. In some embodiments, only the surface structured region of the light guide frame 11 extends outwardly beyond the periphery of the display monitor(s). The lighting display assembly 10 may provide—if the LEDs are operated—a frame or corona of light that extends around the circumference of the arrangement of the display monitors 51, 52. The LEDs 19 may be controlled by the lighting controller to controllably illuminate the surface structure in the light guide frame 11 to attract players to the gaming machine. In at least some embodiments, the center opening 15 of the light guide frame 11 is positioned inward of the outer peripheral edge of the display monitors arrangement such that it is not visible from in front of the display monitor(s). Similarly, in at least some embodiments, the inner non-surface structured region of the light guide frame 11 is positioned behind the monitor(s) so that it is not visible from in front of the display monitor.

The center opening of the lighting display assembly 10 is beneficial because it allows access to the interior of the gaming machine cabinet, e.g., for servicing the gaming machine. In some embodiments, a retainer mounting mechanism for securing or mounting (moveable and/or removable) the display monitor to the gaming machine may also extend through the center opening of the lighting display assembly 10.

According to an embodiment, the display monitor(s) may be connected or attached to the gaming machine cabinet by a lift arm assembly that allows the display monitor or monitor arrangement to be moved between a lowered (operating) position during normal operation and a raised (service) position for servicing.

It is to be understood that, if any prior art is referred to herein, such reference does not constitute an admission that the prior art forms a part of the common general knowledge in the art in any country. In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

What is claimed is:

1. A lighting display assembly comprising:
   a light guide frame composed of at least two or more light guide frame parts made of material that is transparent to light, the light guide frame including a front surface, a rear surface, and a center opening extending between the front and rear surfaces and defining an inner sidewall;
   a light source configured to emit light, the light source being positioned facing the inner sidewall so that light emitted therefrom passes through the inner sidewall and into the light guide frame;
   a surface structure formed in or on the light guide frame and positioned to be illuminated by the light emitted from the light source and entering the inner sidewall of the light guide frame so that the light is scattered and/or refracted and is emitted from the front surface of the light guide frame; and
   a controller configured to controllably activate and deactivate the light source.

2. The lighting display assembly of claim 1, wherein four L-shaped frame parts are provided and arranged to form a respective joint at a top center position and bottom center position and a left center position and a right center position of the lighting display assembly.

3. The lighting display assembly of claim 1, wherein the surface structure reflects and/or refracts at least a portion the light emitted from the light source and entering the inner sidewall of the light guide frame towards the front surface of the light guide frame.

4. The lighting display assembly of claim 1, wherein the lighting display assembly is configured to be mounted behind a display monitor and is sized to extend laterally beyond an outer peripheral edge of the display monitor such that the scattered and/or refracted light is visible from in front of the display monitor.

5. The lighting display assembly of claim 4, wherein the center opening of the light guide frame is positioned inward of the outer peripheral edge of the display monitor when the lighting display assembly is mounted behind the display monitor.

6. The lighting display assembly of claim 1, further comprises a rear panel that is configured to support the light guide frame and the light source relative to one another.

7. The lighting display assembly of claim 6, wherein the light source comprises a bracket that carries a plurality of light emitting diodes or comprises a plurality of brackets that each carry a plurality of light emitting diodes and wherein the or each bracket includes a feature configured to secure the bracket to the rear panel.

8. The lighting display assembly of claim 1, wherein the surface structure is formed in or on the rear surface of the light guide frame.

9. The lighting display assembly of claim 8, wherein the surface structure is screen printed onto the rear surface of the light guide frame.

10. The lighting display assembly of claim 1, further comprising a milky white translucent or opaque cover overlying the light guide frame.

11. The lighting display assembly of claim 1, wherein the lighting display assembly is angled.

12. A gaming machine comprising:
    a cabinet;
    a display monitor supported by the cabinet and having an outer peripheral edge;
    a lighting display assembly positioned behind the display monitor and comprising:
      a light guide frame composed of at least two or more light guide frame parts of material that is transparent to light, the light guide frame including a front surface, a rear surface, and a center opening extending between the front and rear surfaces and defining an inner sidewall;
      a light source configured to emit light, the light source positioned facing the inner sidewall so that light emitted therefrom passes through the inner sidewall and into the light guide frame; and
      a surface structure formed in or on the light guide frame parts and positioned to be illuminated by the light emitted from the light source and entering the inner sidewall of the light guide frame so that the light is scattered and/or refracted; and
    a controller configured to controllably activate and deactivate the light source;
    wherein the light guide frame is sized to extend laterally beyond the outer peripheral edge of the display monitor such that the scattered and/or refracted light is visible from in front of the display monitor.

13. The gaming machine of claim 12, further comprising a milky white translucent or opaque cover overlying the light guide frame.

14. The gaming machine of claim 12, wherein the lighting display assembly is angled.

15. The gaming machine of claim 12, wherein the lighting display assembly further comprises a mounting feature configured to secure the lighting display assembly to at least one of the cabinet and the display monitor.

16. The gaming machine of claim 12, further comprising a mounting mechanism securing the display monitor to the gaming machine, the mounting mechanism extending through the center opening of the light guide frame.

17. The gaming machine of claim 12, further comprises a rear panel that is configured to support the light guide frame and the light source relative to one another.

18. The gaming machine of claim 17, wherein the light source comprises a bracket that carries a plurality of light emitting diodes or comprises a plurality of brackets that each include a plurality of light emitting diodes and wherein the or each bracket includes a feature configured to secure the bracket to the rear panel.

19. The gaming machine of claim 12, wherein the surface structure is formed in the rear surface or is screen printed onto the rear surface of the light guide frame.

20. A gaming machine comprising:
a cabinet;
at least one display monitor supported by the cabinet and having an outer peripheral edge;
a lighting display assembly positioned behind the at least one display monitor and comprising:
- a light guide frame consisting of a single piece of material that is transparent to light, the light guide frame including a front surface, a rear surface, and a center opening extending between the front and rear surfaces and defining an inner sidewall;
- a light source configured to emit light, the light source positioned facing the inner sidewall so that light emitted therefrom passes through the inner sidewall and into the light guide frame; and
- a surface structure formed in or on the light guide frame and positioned to be illuminated by the light emitted from the light source and entering the inner sidewall of the light guide frame so that the light is scattered and/or refracted; and a controller configured to controllably activate and deactivate the light source;
wherein the light guide frame is sized to extend laterally beyond the outer peripheral edge of the at least one display monitor such that the scattered and/or refracted light is visible from in front of the display monitor.

21. The gaming machine of claim 20, further comprising a milky white translucent or opaque cover overlying the light guide frame.

22. The gaming machine of claim 20, wherein the lighting display assembly is angled.

\* \* \* \* \*